(12) United States Patent
Hilgren et al.

(10) Patent No.: US 7,638,067 B2
(45) Date of Patent: Dec. 29, 2009

(54) FOOD PROCESSING EFFLUENT REFURBISHING SYSTEM AND METHOD

(75) Inventors: John D. Hilgren, Shoreview, MN (US); Roger J. Tippett, Rosemount, MN (US); Scott L. Burnett, St. Paul, MN (US)

(73) Assignee: Ecolab Inc., St. Paul, MN (US)

( * ) Notice: Subject to any disclaimer, the term of this patent is extended or adjusted under 35 U.S.C. 154(b) by 917 days.

(21) Appl. No.: 11/335,232

(22) Filed: Jan. 19, 2006

(65) Prior Publication Data

US 2007/0163966 A1    Jul. 19, 2007

(51) Int. Cl.
C02F 9/00    (2006.01)

(52) U.S. Cl. .................. 210/748; 210/764; 210/202

(58) Field of Classification Search .............. 210/748, 210/746, 600, 202, 742, 791, 85, 103, 195.1, 210/259, 908; 426/321; 119/75
See application file for complete search history.

(56) References Cited

U.S. PATENT DOCUMENTS

| | | | |
|---|---|---|---|
| 4,827,727 A | 5/1989 | Caracciolo | |
| 4,947,518 A | 8/1990 | Covell, III | |
| 5,053,140 A | 10/1991 | Hurst | |
| 5,173,190 A | 12/1992 | Picek | |
| 5,405,631 A | 4/1995 | Rosenthal | |
| 5,798,047 A | 8/1998 | Tekawa | |
| 6,106,731 A * | 8/2000 | Hayes | 210/760 |
| 6,235,191 B1 | 5/2001 | Nakamura | |
| 6,503,401 B1 * | 1/2003 | Willis | 210/748 |
| 6,514,556 B2 * | 2/2003 | Hilgren et al. | 426/652 |
| 6,605,253 B1 | 8/2003 | Perkins | |
| 2003/0094422 A1 | 5/2003 | Perkins et al. | |
| 2003/0205514 A1 | 11/2003 | Potter et al. | |
| 2005/0061737 A1 | 3/2005 | Linden et al. | |
| 2005/0211643 A1 | 9/2005 | Phillips et al. | |

FOREIGN PATENT DOCUMENTS

EP    0 411 970 A1    2/1991
NL    A 9201631    4/1994

* cited by examiner

*Primary Examiner*—Walter D Griffin
*Assistant Examiner*—Cameron J Allen
(74) *Attorney, Agent, or Firm*—Andrew D. Sorensen

(57) ABSTRACT

A food processing effluent refurbishing system of the present invention refurbishes effluent water in a first and a second food processing loop. The system includes first and second circulation systems, first and second balance tanks, and a side stream. The first circulation system circulates water through the first food processing loop. The first balance tank connected to the first circulation system refurbishes effluent water circulating through the first food processing loop. The second circulation system circulates water through the second food processing loop. The second balance tank connected to the second circulation system refurbishes effluent water circulating through the second food processing loop. The side stream connects the first and second circulation systems.

20 Claims, 3 Drawing Sheets

FOOD PROCESSING EFFLUENT REFURBISHING SYSTEM AND METHOD

BACKGROUND OF THE INVENTION

The present invention relates to the field of refurbishing processing water. In particular, the present invention relates to a system and a method for on-site refurbishing of food processing effluent water.

Modern food processing operations require a large quantity of water in processing foods. As an example, poultry slaughter operations use about six to eight gallons of water per bird. During poultry slaughter, the birds must be washed before, during, and after evisceration. After the water is used to wash the food product, the effluent water is typically sent directly to a drain and disposed of. It is desirable to minimize the amount of water used during food processing operations in order to reduce water costs, as well as labor costs, without compromising the efficiency of the process.

An obstacle in reducing the amount of water consumption per piece of food product is identifying a compact, simple, and inexpensive water reuse system that does not adulterate or degrade food safety, quality, color, and/or taste of the final food product. In typical water reuse systems, spent water is reclaimed and reconditioned through a filtration and treatment process. During the filtration and treatment process, large and small suspended particles are first filtered from the water. The filtered water is then treated with antimicrobial solution to destroy microorganisms present in the water. The refurbished water is then returned to the food processing system for reuse.

Current water purification systems known in the art require a large amount of space as well as on-site operators due to the complexity of the systems. Less complex systems have limited applicability because they cannot effectively remove smaller suspended particles, such as bacteria, or dissolved materials that can degrade food safety and quality from the reclaimed water.

BRIEF SUMMARY OF THE INVENTION

A food processing effluent refurbishing system of the present invention refurbishes effluent water in a first and a second food processing loop. The system includes a first and a second circulation system, a first and a second balance tank, and a side stream. The first circulation system circulates water through the first food processing loop and the second circulation system circulates water through the second food processing loop. The first balance tank connected to the first circulation system refurbishes effluent water circulating through the first food processing loop and the second balance tank connected to the second circulation system refurbishes effluent water circulating through the second food processing loop. The side stream connects the first and second circulation systems.

DETAILED DESCRIPTION

Figure 1:
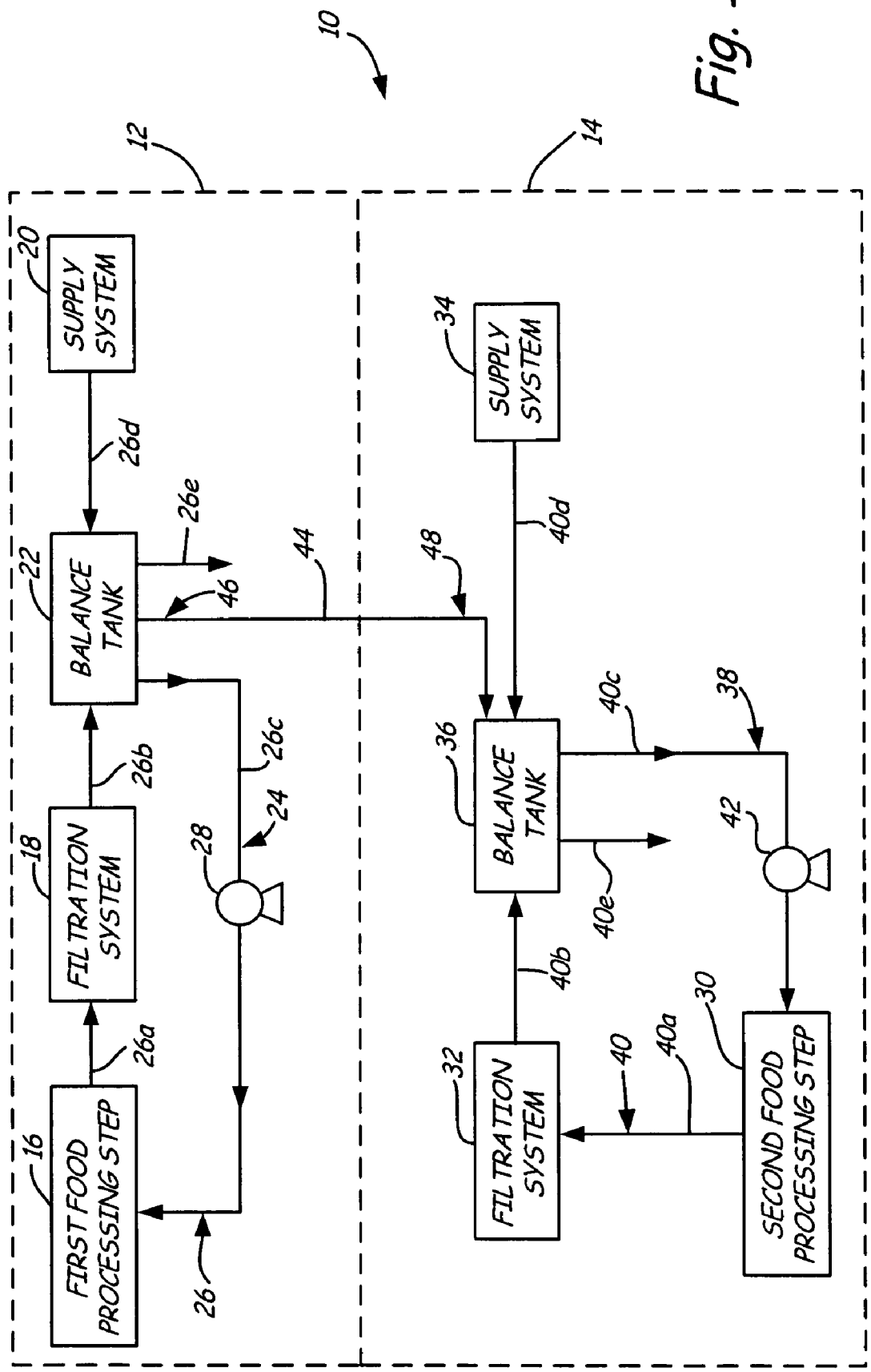
FIG. 1 is a block diagram of a first embodiment of an effluent water refurbishing and reapplication system of the present invention.

FIG. 1 is a block diagram of effluent water refurbishing and reapplication system 10, which permits the reuse of processing water during food processing by refurbishing the processing water and is beneficial for reducing fresh water consumption and labor costs. Refurbishing system 10 generally includes first food processing loop 12 and second food processing loop 14. First food processing loop 12 includes first food processing step 16, filtration system 18, supply system 20, balance tank 22, and circulation system 24. Circulation system 24 of first food processing loop 12 includes piping 26 and pump 28 and circulates water through first food processing loop 12.

Circulation system 24 circulates effluent water through first food processing loop 12. Piping 26 of circulation system 24 generally includes first intermediate line 26a, second intermediate line 26b, third intermediate line 26c, supply line 26d, and overflow line 26e. First intermediate line 26a connects first food processing step 16 to filtration system 18. Second intermediate line 26b connects filtration system 18 to balance tank 22. Third intermediate line 26c connects balance tank 22 to first food processing step 16. Supply line 26d connects supply tank 20 to balance tank 22. Overflow line 26e allows excess water in balance tank 22 to flow to a drain to be discarded. Pump 28 of circulation system 24 can be generally positioned anywhere in first food processing loop 12 and pumps effluent water through first food processing loop 12. Although FIG. 1 depicts only one pump, additional pumps may be added in first food processing loop 12 as needed.

First food processing step 16 can be any stage in a food processing operation, including, but not limited to: poultry slaughter, beef slaughter, pork slaughter, lamb slaughter, fish processing, shellfish processing, fruit processing, or vegetable processing. After the effluent water leaves first food processing step 16, the effluent water may contain larger suspended solids in the effluent water from first food processing step 16, such as feathers, pebbles, twigs, or other debris. To filter any large suspended solids from the effluent water, the effluent water is passed through filtration system 18 after leaving first food processing step 16.

Filtration system 18 is typically located proximate first food processing step 16 and removes suspended solids from the effluent water leaving first food processing step 16. Filtration system 18 may remove the solids by any number of methods; for example, filtration system 18 may comprise a rotary drum screen. In one embodiment, filtration system 18 includes at least one self-cleaning filter. Although the effluent water has been filtered of any larger suspended solids, the effluent water still contains potentially harmful microorganisms and cannot be reused without first being treated. To inactivate the microorganisms in the effluent water, the effluent water is treated with chemicals from supply system 20 while being held in balance tank 22.

Supply system 20 contains both fresh water and chemicals to treat the effluent water in balance tank 22. When fresh water is needed in balance tank 22, supply system 20 injects fresh water into balance tank 22 to refresh the water supply. Likewise, when chemicals are needed in balance tank 22 to treat the effluent water, supply system 20 injects the necessary amount of chemicals into balance tank 22.

In one embodiment, the chemical in supply system 20 is a biocide that may include, but is not limited to: peroxygen compounds, ozone, chlorine dioxide, acidified sodium chlorite, chlorine, chlorine releasing agents, bromine releasing agents, quaternary ammonium compounds, cetylpyridinium chloride, organic acids, and mixtures thereof. The peroxygen compounds are chosen from a group that includes, but is not limited to: peroxyacetic acid, peroxyoctanoic acid, peroxyformic acid, peroxypropionic acid, peroxyheptanoic acid, peroxybenzoic acid, peroxynonanoic acid, monoperglutaric acid, diperglutaric acid, succinylperoxide, hydrogen peroxide, and mixtures thereof.

Balance tank 22 has a volume sufficient to provide an effluent holding time necessary to completely refurbish the effluent water in balance tank 22. The effluent water is considered refurbished when harmful organics or inorganics in the effluent water are destroyed and the water is suitable for reuse. Balance tank 22 includes influent assemblies and is connected to overflow line 26e. The influent assemblies control the injection of fresh water and chemicals from supply system 20 into balance tank 22. The chemicals from supply system 20 are injected into balance tank 22 to react with the effluent water and destroy any microorganisms present in the water. A neutral or positive balance of fluid is maintained in balance tank 22 during normal operation to result in a steady level or discharge of fluid through line 26e to a drain for disposal. After the effluent water has been refurbished in balance tank 22, third intermediate line 26c transports a portion of the refurbished effluent water back to first food processing step 16 for reuse.

Second food processing loop 14 includes second food processing step 30, filtration system 32, balance tank 36, and circulation system 38. Second food processing loop may optionally include supply system 34. Circulation system 38 of second food processing loop 14 includes piping 40 and pump 42. Piping 40 of circulation system 38 includes first intermediate line 40a, second intermediate line 40b, third intermediate line 40c, and overflow line 40e. If second food processing loop 30 includes supply system 34, piping 40 of circulation system 38 will also include supply line 40d. Second food processing step 30, filtration system 32, supply system 34, balance tank 36, and circulation system 38 of second food processing loop 14 are connected and function in the same manner as first food processing step 16, filtration system 18, supply system 20, balance tank 22, and circulation system 24 of first food processing loop 12. Second food processing step 30 can be any stage in a food process located upstream of first food processing step 16.

Side stream 44 has a first end 46 and a second end 48 and connects first food processing loop 12 and second processing loop 14 to each other. First end 46 of side stream 44 is connected to balance tank 22 of first processing loop 12 and second end 48 of side stream 44 is connected to balance tank 36 of second processing loop 14. Side stream 44 transports refurbished effluent water from balance tank 22 of first food processing loop 12 to second processing loop 14 for use in second food processing step 30.

Figure 2:
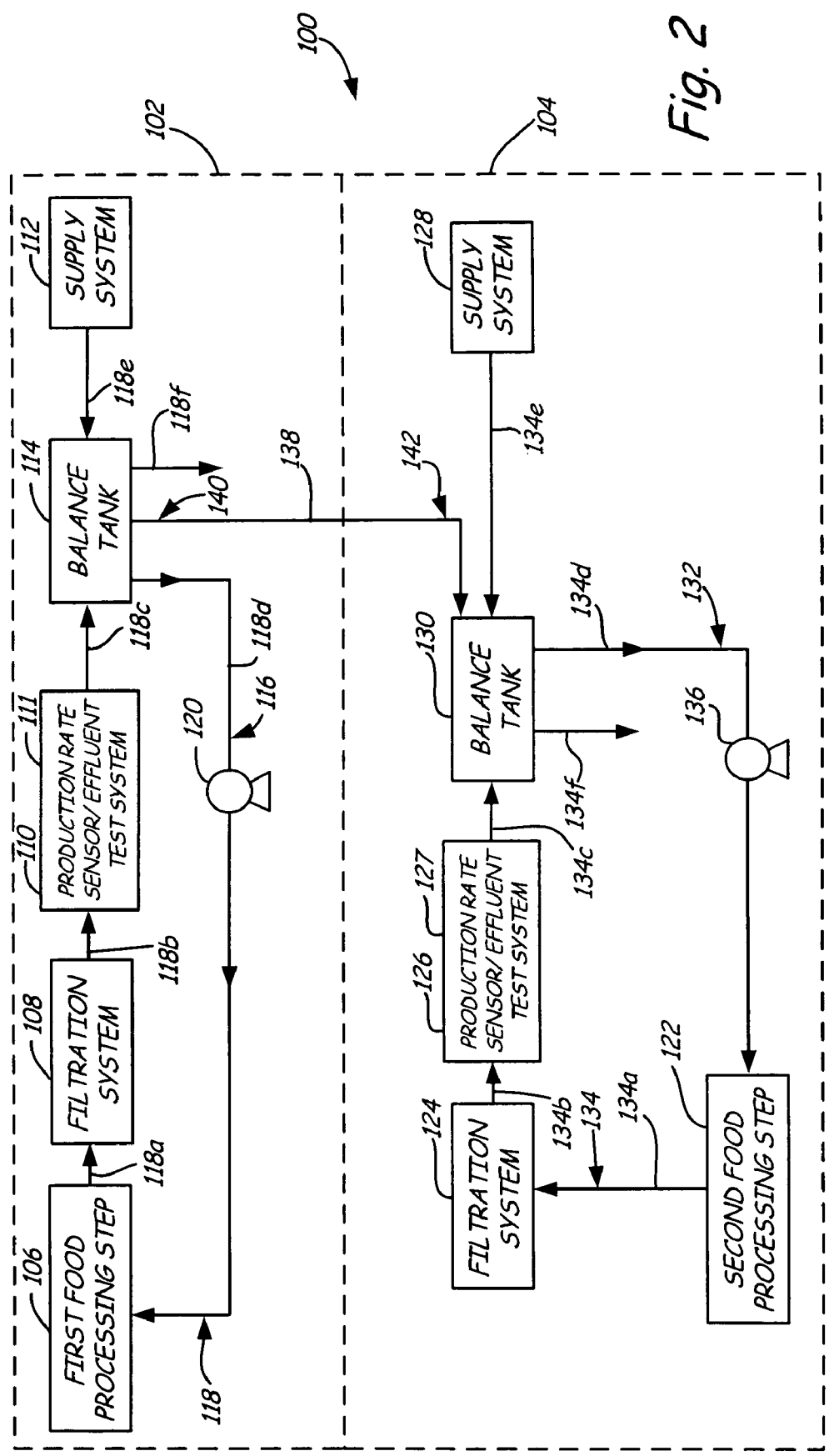
FIG. 2 is a block diagram of a second embodiment of the effluent water refurbishing and reapplication system of the present invention.

FIG. 2 shows a block diagram of a second embodiment of refurbishing system 100. Refurbishing system 100 generally includes a first food processing loop 102 and a second processing loop 104. First food processing loop 102 includes first food processing step 106, filtration system 108, production rate sensor 110 or effluent test system 111, supply system 112, balance tank 114, and circulation system 116. Circulation system 116 of first food processing loop 102 includes piping 118 and pump 120 and circulates water through first food processing loop 102.

Piping 118 of circulation system 116 generally includes first intermediate line 118a, second intermediate line 118b, third intermediate line 118c, fourth intermediate line 118d, supply line 118e, and overflow line 118f. First intermediate line 118a connects first food processing step 106 to filtration system 108. Second intermediate line 118b connects filtration system 108 to production rate sensor 110. Third intermediate line 118c connects production rate sensor 110 to balance tank 114. Fourth intermediate line 118d connects balance tank 114 to first food processing step 106. Supply line 118e connects supply system 112 to balance tank 114. Overflow line 118f allows excess water in balance tank 114 to flow to a drain. Pump 116 of circulation system 116 can be generally positioned anywhere in first food processing loop 102 and pumps effluent water through first food processing loop 102. As with refurbishing system 10, although FIG. 2 depicts only one pump, refurbishing system 100 may include additional pumps anywhere in first food processing loop 102 as needed.

Second food processing loop 104 includes second food processing step 122, filtration system 124, balance tank 130, and circulation system 132. Second food processing loop 104 may optionally include production rate sensor 126 or effluent test system 127, and may also optionally include supply system 128. Circulation system 132 of second processing loop 104 includes piping 134 and pump 136 and circulates water in piping 134 through second food processing loop 104. Piping 134 of circulation system 132 generally includes first intermediate line 134a, second intermediate line 134b, third intermediate line 134c, fourth intermediate line 134d, and overflow line 134f. If second food processing loop 104 includes supply system 128, piping 134 of circulation system 132 will also include supply line 134e. Second food processing step 122, filtration system 124, supply system 128, balance tank 130, and circulation system 132 of second food processing loop 104 are connected and function in the same manner as first food processing step 106, filtration system 108, supply system 112, balance tank 114, and circulation system 116 of first food processing loop 102. Second food processing step 122 can be any stage in a raw food processing system located upstream of first food processing step 106.

First food processing loop 102 and second food processing loop 104 are connected to each other by side stream 138. Side stream 138 has a first end 140 and a second end 142. First end 140 of side stream 138 is connected to balance tank 114 of first food processing loop 102 and second end 142 of side stream 138 is connected to balance tank 130 of second food processing loop 104.

Food processing steps 106 and 122, filtration systems 108 and 124, supply systems 112 and 128, balance tanks 114 and 130, and circulation systems 116 and 132 of first and second food processing loops 102 and 104, respectively, of the second embodiment of refurbishing system 100 interact and function in the same manner as food processing steps 16 and 30, filtration systems 18 and 32, supply systems 20 and 34, balance tanks 22 and 36, and circulation systems 24 and 38 of first and second food processing loops 12 and 14, respectively, of the first embodiment of refurbishing system 10. The only difference between first and second embodiments of refurbishing systems 10 and 100 is the addition of production rate sensors 110 and 126 or effluent test systems 111 and 127, respectively.

Production rate sensor 110 of first food processing loop 102 includes a sensor for measuring the rate of food product passing through first food processing step 106. The faster the food processing production rate, the faster the effluent water becomes soiled and needs treatment. Thus, by monitoring the food processing production rate, the rate at which chemicals or fresh water is injected into balance tank 114 of first food processing loop 102 from supply system 112 can be adjusted to ensure that the effluent water is properly refurbished at all times. In one embodiment, production rate sensor 110 is a photoelectric "eye." Effluent test system 111 of first food processing loop 102 may include a sensor for monitoring the unrefurbished effluent water for contaminant materials and automatically adjusts the rate at which chemicals or water is injected from supply system 112 to balance tank 114. The sensor can measure a number of parameters of the effluent water, including, but not limited to: conductivity, turbidity, color, density, impedance, biological markers, or a mixture thereof. When the parameter measured increases above a set point, the sensor sends a signal and supply system 112 adjusts the rate at which chemicals and/or fresh water are discharged from supply system 112 into balance tank 114 to treat the effluent water. Production rate sensor 126 and effluent test system 127 of second processing loop 104 functions in the same manner as production rate sensor 110 and effluent system test 111 of first food processing loop 102 and controls the discharge of chemicals and/or fresh water into second processing loop 104 when needed.

Figure 3:
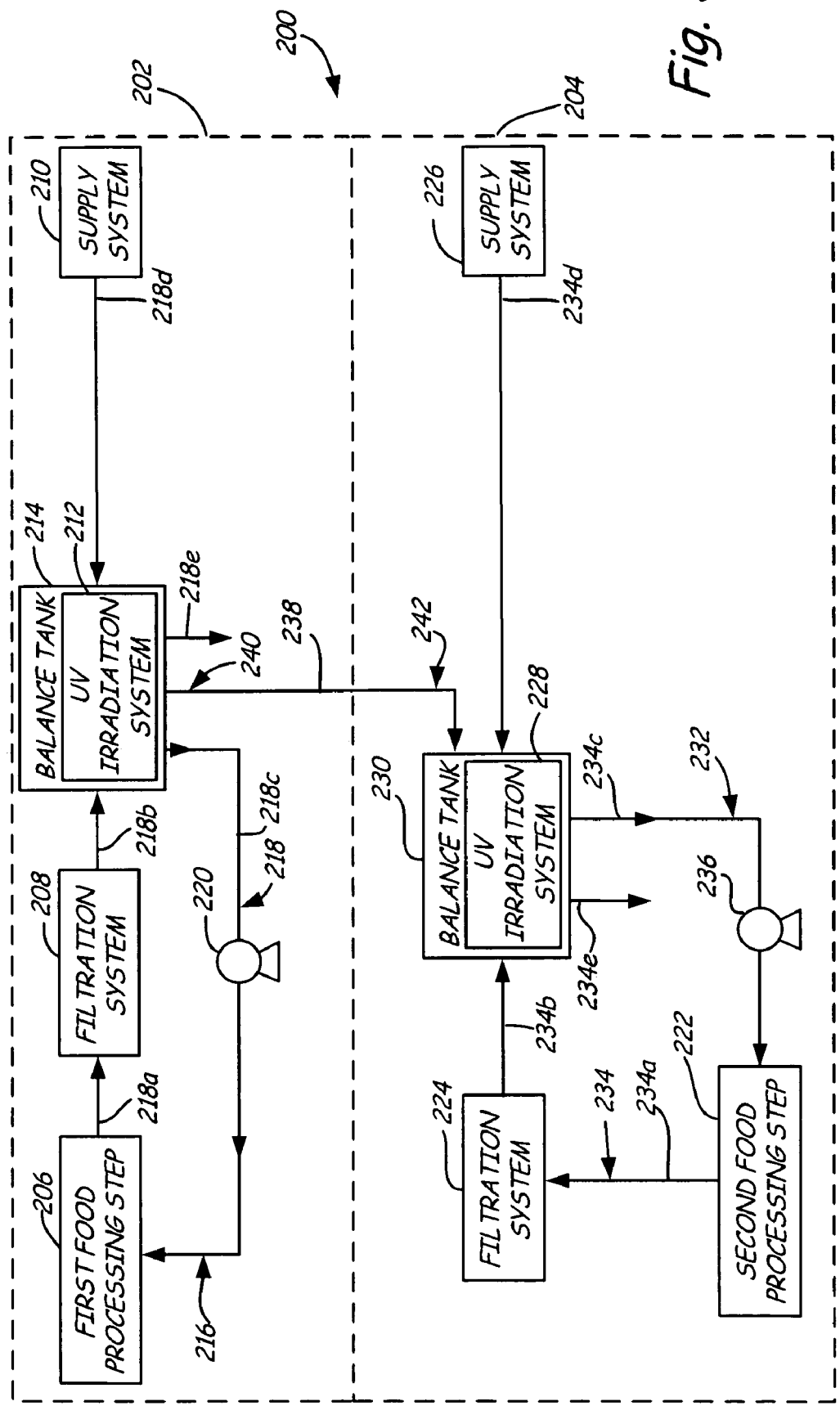
FIG. 3 is a block diagram of a third embodiment of the effluent water refurbishing and reapplication system of the present invention.

FIG. 3 shows a block diagram of a third embodiment of refurbishing system 200 of the present invention. Refurbishing system 200 generally includes a first food processing loop 202 and a second processing loop 204. First food processing loop 202 includes first food processing step 206, filtration system 208, supply system 210, ultraviolet (UV) irradiation system 212 within balance tank 214, and circulation system 216. Circulation system 216 of first food processing loop 202 includes piping 218 and pump 220 and circulates water in piping 218 through first food processing loop 202.

Piping 218 of circulation system 216 generally includes first intermediate line 218a, second intermediate line 218b, third intermediate line 218c, supply line 218d, and overflow line 218e. First intermediate line 218a connects first food processing step 206 to filtration system 208. Second intermediate line 218b connects filtration system 208 to UV irradiation system 212 in balance tank 214. Third intermediate line 218c connects balance tank 214 to first food processing step 206. Supply line 218d connects supply system 210 to UV irradiation system 212 in balance tank 214. Overflow line 218e allows excess water in balance tank 214 to flow to a drain. Pump 216 of circulation system 216 can be generally positioned anywhere in first food processing loop 202 and pumps effluent water through first food processing loop 202. As with refurbishing system 10 and refurbishing system 100, although FIG. 3 depicts only one pump, refurbishing system 200 may include additional pumps anywhere in first food processing loop 202 as needed.

Second food processing loop 204 includes second food processing step 222, filtration system 224, ultraviolet (UV) irradiation system 228 within balance tank 230, and circulation system 232. Second food processing loop 204 may optionally include supply system 226. Circulation system 232 of second processing loop 204 includes piping 234 and pump 236 and circulates water in piping 234 through second food processing loop 204. Piping 234 of circulation system 232 generally includes first intermediate line 234a, second intermediate line 234b, third intermediate line 234c, supply line 234d, and overflow line 234e. Second food processing step 222, filtration system 224, supply system 226, UV irradiation system 228, balance tank 230, and circulation system 232 of second food processing loop 204 are connected and function in the same manner as first food processing step 206, filtration system 208, supply tank 210, UV irradiation system 212, and balance tank 214, and circulation system 216 of first food processing loop 202. Second food processing step 222 can be any stage in a raw food processing system located upstream of first food processing step 206.

First food processing loop 202 and second food processing loop 204 are connected to each other by side stream 238. Side stream 238 has a first end 240 and a second end 242. First end 240 of side stream 238 is connected to UV irradiation system 212 and balance tank 214 of first food processing loop 202 and second end 242 of side stream 238 is connected to UV irradiation system 212 and balance tank 230 of second food processing loop 204.

Food processing steps 206 and 222, filtration systems 208 and 224, supply systems 210 and 226, UV irradiation systems 212 and 228 within balance tanks 214 and 230, respectively, and circulation systems 216 and 232 of first and second food processing loops 202 and 204, respectively, of the third embodiment of refurbishing system 200 interact and function in the same manner as food processing steps 16 and 30, filtration systems 18 and 32, supply systems 20 and 34, balance tanks 22 and 36, and circulation systems 24 and 38 of first and second food processing loops 12 and 14, respectively, of the first embodiment of refurbishing system 10. The only difference between first and third embodiments of refurbishing systems 10 and 200 is the addition of ultraviolet irradiation systems 212 and 228 to balance tanks 214 and 230, respectively.

Ultraviolet irradiation system 212 in balance tank 214 includes an ultraviolet (UV) radiation generator that is capable of transmitting flashes, or pulses, of energy and provides increased efficacy in destroying microorganisms when used in combination with the chemicals supplied by supply system 210. The UV radiation treatment makes the effluent water more suitable for reuse. The efficacy of destroying bacterial spores and non-sporeforming bacteria in effluent water can be increased 30 to 2000 times if UV radiation is used in addition to the chemicals in supply tank 210. However, the effectiveness of UV radiation and chemicals such as peroxyacids in reducing the amount of bacteria in the water depends in part on the quality of the effluent water. Effective dosing of UV is significantly influenced by the quality of the effluent water and the constituents present in the water that absorb UV light. The transmission of UV light through the effluent water decreases as the level of organic and inorganic contamination increases. As a result, additional UV energy is needed to treat the water when the effluent water contains a high concentration of particles. Some factors in determining water quality and effectiveness of UV transmission include, but are not limited to: color, metals, organic matter, suspended and dissolved solids, and turbidity of the water. In one embodiment, ultraviolet irradiation system 212 provides a transmission of approximately 200 nanometers (nm) to 300 nm.

Ultraviolet irradiation system 228 of second food processing loop 204 functions in the same manner as ultraviolet irradiation system 212 of first food processing loop 202.

Although first, second, and third embodiments of refurbishing systems 10, 100, and 200 are discussed separately, refurbishing systems 10, 100, and 200 may be combined as desired without departing from the intended scope of the invention. In addition, although first, second, and third embodiments of refurbishing systems 10, 100, and 200 are discussed as comprising only two food processing loops, refurbishing systems 10, 100, and 200 can comprise any number of food processing loops as long as the effluent water can be adequately treated to maintain the level of organics and inorganics in the effluent water below industry requirements.

The effluent water refurbishing system of the present invention reduces raw food processing costs by refurbishing effluent water circulating through a first processing loop for reuse. After leaving a first food processing step, the effluent water is filtered to remove large suspended solids from the effluent water. The filtered water is then sent to a balance tank to be refurbished for reuse. While in the balance tank, the effluent water is treated with antimicrobial solution and fresh water injected from a supply system connected to the balance tank. The refurbished effluent water is then transported either back to the first food processing step or to a second food processing loop for reuse through a side stream. The food processing loops can optionally each include a production sensor that measures the food production rate or an effluent test system that measures a parameter of the effluent water to determine the amount of chemicals or fresh water that should be added to the food processing loops to ensure that the effluent water is refurbished and is suitable for reuse. The food processing loops can each also optionally include an ultraviolet irradiation system that increases the efficacy of destroying microorganisms present in the effluent water.

Although the present invention has been described with reference to preferred embodiments, workers skilled in the art will recognize that changes may be made in form and detail without departing from the spirit and scope of the invention.

The invention claimed is:

1. A system for refurbishing effluent water used in a first food processing loop and a second food processing loop, the system comprising:
    (a) a first circulation system circulating water through the first food processing loop;
    (b) a first balance tank connected to the first circulation system for refurbishing effluent water circulating through the first food processing loop;
    (c) a second circulation system circulating water through the second food processing loop;
    (d) a second balance tank connected to the second circulation system for refurbishing effluent water circulating through the second food processing loop; and
    (e) a side stream connecting the first and second circulation systems.

2. The system of claim 1, wherein the first and second food processing loops each comprise a filtration assembly for removing suspended solids from the effluent water in each of the circulation systems.

3. The system of claim 1, wherein the first and second balance tanks each comprise influent assemblies for injecting fresh water and at least one disinfecting chemical.

4. The system of claim 3, wherein the chemical comprises a biocide selected from the group consisting of peroxygen compounds, ozone, chlorine dioxide, acidified sodium chlorite, chlorine, chlorine releasing agents, bromine releasing agents, quaternary ammonium compounds, cetylpyridinium chloride, organic acids, or mixtures thereof.

5. The system of claim 4, wherein the peroxygen compounds are selected from the group consisting of peroxyacetic acid, peroxyoctanoic acid, peroxyformic acid, peroxypropionic acid, peroxyheptanoic acid, peroxybenzoic acid, peroxynonanoic acid, monoperglutaric acid, diperglutaric acid, succinylperoxide, hydrogen peroxide, and mixtures thereof.

6. The system of claim 1, and further comprising a sensor for measuring a parameter of the effluent water, wherein the parameter is selected from the group consisting of conductivity, turbidity, color, density, impedance, biological markers, and mixtures thereof.

7. The system of claim 1, and further comprising a sensor for measuring a rate of food product passing through a step of the first or second food processing loops.

8. The system of claim 1, and further comprising an ultraviolet irradiation assembly for irradiating effluent water.

9. A food processing effluent refurbishing system for refurbishing effluent water to a plurality of food processing loops, the system comprising:
    (a) a plurality of circulation systems circulating water through the plurality of food processing loops;
    (b) balance tanks connected to the plurality of circulation systems for refurbishing effluent water circulating through the plurality of food processing loops; and
    (c) side streams connecting the plurality of circulation systems.

10. The system of claim 9, wherein the plurality of balance tanks each comprises a sensor for measuring a parameter of the effluent water.

11. The system of claim 10, wherein each of the sensors control injection of antimicrobial solution into the effluent water based on a food processing production rate of the effluent water.

12. The system of claim 9, wherein the balance tanks are connected to receive antimicrobial solution.

13. The system of claim 9, wherein the antimicrobial solution comprises a biocide selected from the group consisting of peroxygen compounds, ozone, chlorine dioxide, acidified sodium chlorite, chlorine, chlorine releasing agents, bromine releasing agents, quaternary ammonium compounds, cetylpyridinium chloride, organic acids, or mixtures thereof.

14. The system of claim 9, and further comprising a filtration assembly connected to each of the plurality of food processing loops for removing suspended solids from the effluent water.

15. The system of claim 9, wherein each of the balance tanks are sized to provide an effluent water holding time necessary to complete effluent water refurbishing.

16. A method of refurbishing effluent water in a first and a second food processing system, the method comprising:
    (a) circulating water through the first food processing systems and the second food processing system;
    (b) adding antimicrobial solution to the first food processing system sufficient to refurbish the effluent water;
    (c) diverting water from the first food processing system to a side stream connecting the first and the second food processing systems; and
    (d) introducing water from the side stream into the second food processing system.

17. The method of claim 16, wherein adding antimicrobial solution comprises a sensing a parameter of the effluent water and controlling the introduction of antimicrobial solution based on the sensed parameter.

18. The method of claim 16, wherein circulating water through the first and second food processing systems includes filtering the water.

19. The method of claim 16, wherein adding antimicrobial solution comprises adding a biocide selected from the group consisting of peroxygen compounds, ozone, chlorine dioxide, acidified sodium chlorite, chlorine, chlorine releasing agents, bromine releasing agents, quaternary ammonium compounds, cetylpyridinium chloride, organic acids, or mixtures thereof.

20. The method of claim 16, and further comprising irradiating the effluent water with ultraviolet light.

* * * * *

UNITED STATES PATENT AND TRADEMARK OFFICE
CERTIFICATE OF CORRECTION

PATENT NO.       : 7,638,067 B2                                        Page 1 of 1
APPLICATION NO.  : 11/335232
DATED            : December 29, 2009
INVENTOR(S)      : Hilgren et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1016 days.

Signed and Sealed this

Ninth Day of November, 2010

David J. Kappos
*Director of the United States Patent and Trademark Office*